(12) United States Patent
Xiong et al.

(10) Patent No.: US 12,407,471 B2
(45) Date of Patent: *Sep. 2, 2025

(54) PHYSICAL BROADCAST CHANNEL DESIGN

(71) Applicant: Apple Inc., Cupertino, CA (US)

(72) Inventors: Gang Xiong, Beaverton, OR (US); Hyejung Jung, Palatine, IL (US); Ralf Bendlin, Portland, OR (US); Jong-Kae Fwu, Sunnyvale, CA (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,102

(22) Filed: Apr. 21, 2022

(65) Prior Publication Data
US 2022/0247540 A1    Aug. 4, 2022

Related U.S. Application Data

(63) Continuation of application No. 16/408,461, filed on May 9, 2019, now Pat. No. 11,343,048, which is a continuation of application No. 15/565,466, filed as application No. PCT/US2015/066922 on Dec. 18, 2015, now Pat. No. 10,505,689.

(60) Provisional application No. 62/199,175, filed on Jul. 30, 2015.

(51) Int. Cl.
*H04W 74/00* (2009.01)
*H04L 1/00* (2006.01)
*H04L 5/00* (2006.01)
*H04W 72/044* (2023.01)
*H04L 1/06* (2006.01)
*H04W 84/04* (2009.01)

(52) U.S. Cl.
CPC .......... *H04L 5/0053* (2013.01); *H04L 1/0061* (2013.01); *H04L 1/0067* (2013.01); *H04W 72/044* (2013.01); *H04L 2001/0093* (2013.01); *H04L 1/0606* (2013.01); *H04L 5/0051* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 9,363,753 B2 * | 6/2016 | Damnjanovic | H04W 52/0209 |
| 2013/0044664 A1 * | 2/2013 | Nory | H04L 1/0045 370/336 |
| 2015/0341908 A1 * | 11/2015 | Wang | H04J 1/12 370/312 |

(Continued)

*Primary Examiner* — Sithu Ko
(74) *Attorney, Agent, or Firm* — Fay Kaplun & Marcin, LLP

(57) ABSTRACT

Briefly, in accordance with one or more embodiments, apparatus of an evolved NodeB (eNB) comprises circuitry to configure one or more parameters for a 5G master information block (xMIB). The xMIB contains at least one of the following parameters: downlink system bandwidth, system frame number (SFN), or configuration for other physical channels, or a combination thereof. The apparatus of the eNB comprises circuitry to transmit the xMIB via a 5G physical broadcast channel (xPBCH) on a predefined resource, the xPBCH comprising a xPBCH. The xPBCH may use a DM-RS based transmission mode, and a beamformed xPBCH may be used for mid band and high band.

20 Claims, 11 Drawing Sheets

(56) References Cited

U.S. PATENT DOCUMENTS

2016/0277225 A1* 9/2016 Frenne .................. H04L 5/0048
2018/0159671 A1* 6/2018 Kim .................. H04W 72/0446

* cited by examiner

PHYSICAL BROADCAST CHANNEL DESIGN

CROSS-REFERENCE TO RELATED APPLICATIONS

The present application is a continuation of U.S. application Ser. No. 15/565,466 filed Oct. 10, 2107 which is a national stage filing of International Application No. PCT/US2015/066922 filed Dec. 18, 2015 which in turn claims the benefit of U.S. Provisional Application No. 62/199,175 filed Jul. 30, 2015. Said application Ser. No. 15/565,466, said Application No. Application No. PCT/US2015/066922, and said Application No. 62/199,175 are hereby incorporated herein by reference in their entireties.

BACKGROUND

Mobile communication has evolved significantly from early voice systems to today's highly sophisticated integrated communication platform. Networks operating in according with a Third Generation Partnership Project (3GPP) and such as Fourth Generation (4G) Long Term Evolution (LTE) standard are deployed in more than 100 countries to provide service in various spectrum band allocations depending on the spectrum regime. Recently, significant momentum has started to build around the idea of a next generation of wireless communications technology referred to as the Fifth Generation (5G).

The next generation 5G wireless communication systems will provide access to information and sharing of data anywhere, anytime by various users and applications. Next generation 5G technology is expected to provide a unified network and system to meet vastly different, and sometime conflicting, performance dimensions and services. Such diverse multi-dimensional specifications are driven by different services and applications. In order to address vastly diverse specifications, 5G will be the set of technical components and systems to overcome the limits of current systems. In general, 5G will evolve based on 3GPP LTE-Advanced standards with additional potential new Radio Access Technologies (RATs) to enrich users with better, simpler and more seamless wireless connectivity solutions. In addition, 5G will enable everything connected by wireless networks to deliver fast and rich contents and services.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1A:
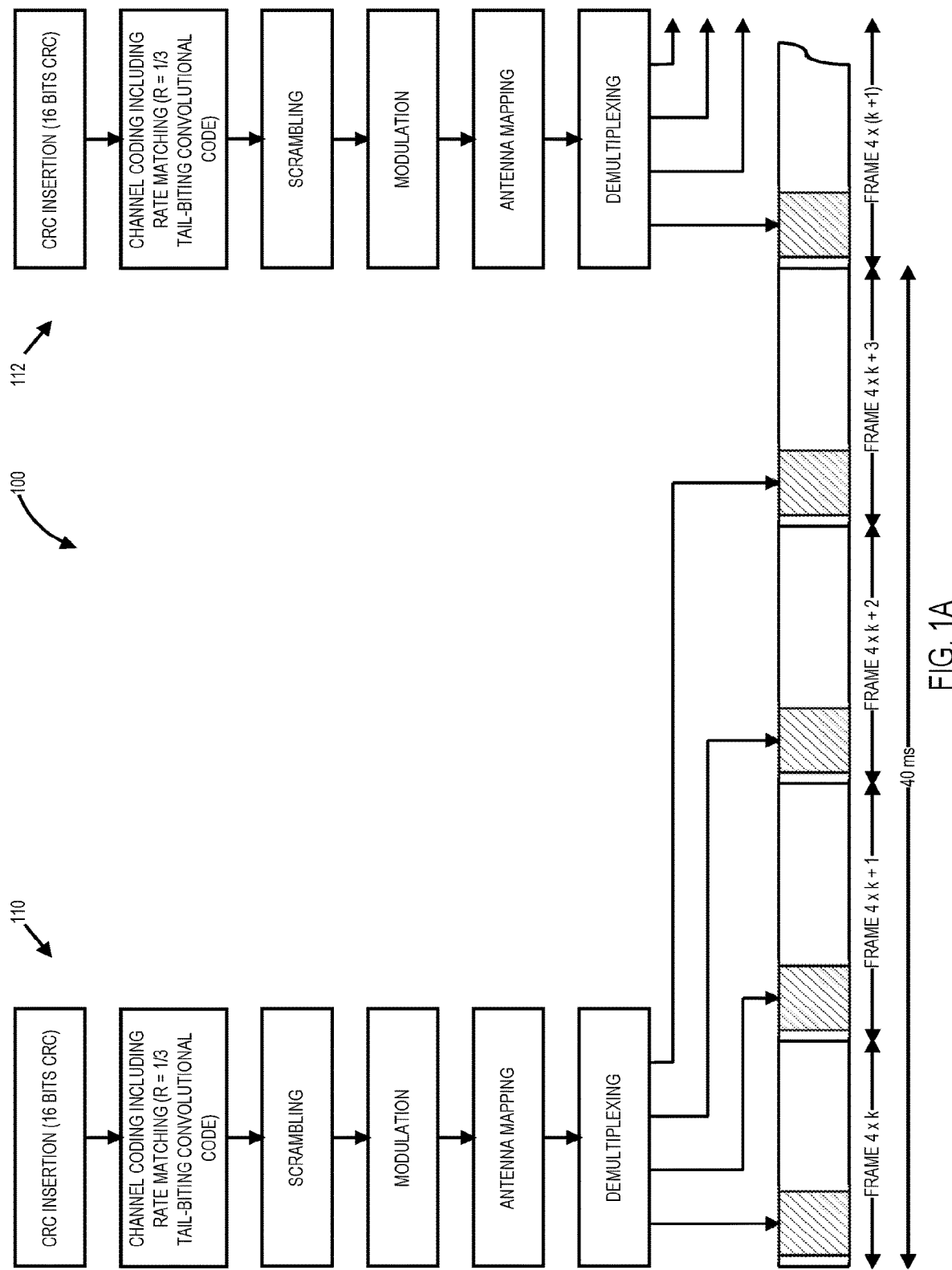
FIG. 1A and FIG. 1B are diagrams of generation procedures for a physical broadcast channel (PBCH) structure including an xPBCH generation procedure in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1B:
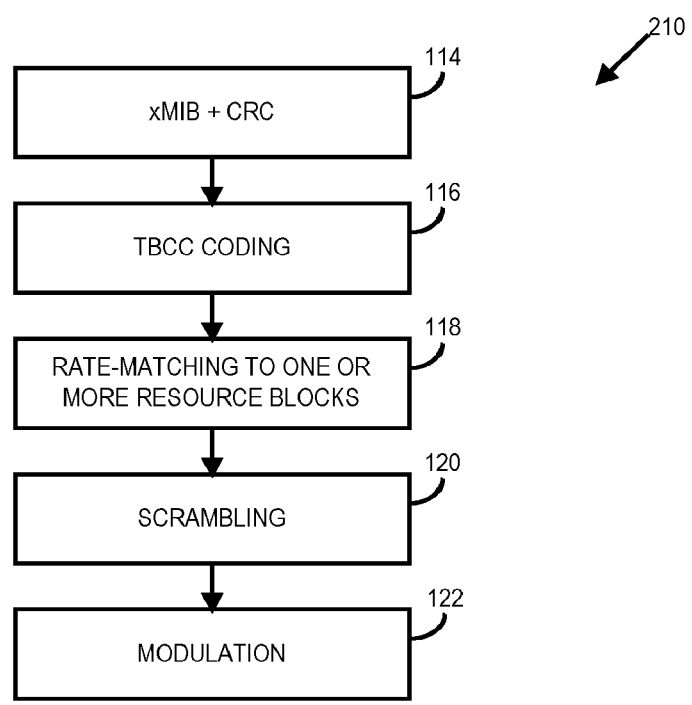

Referring now to FIG. 1A and FIG. 1B, diagrams of generation procedures for a physical broadcast channel (PBCH) structure including an xPBCH generation procedure in accordance with one or more embodiments will be discussed. FIG. 1A illustrates generation of the physical broadcast channel (PBCH) structure 100 for a network operating in accordance with a Third Generation Partnership Project (3GPP) standard such as a Long Term Evolution (LTE) standard. FIG. 1B illustrates generation of the physical broadcast structure (xPBCH) for a network operating in accordance with a Fifth Generation (5G) standard. It should be noted that terms that include the prefix "x" may refer to a 5G standard, although the scope of the claimed subject matter is not necessarily limited in this respect. In one or more embodiments, the xPBCH 210 of FIG. 1B optionally may incorporate one or more portions of the PBCH of FIG. 1B, with one or more new, additional procedures for generation of the new xPBCH structure of FIG. 1B, although the scope of the claimed subject matter is not limited in this respect. As shown in FIG. 1A, one broadcast channel (BCH) transport block is shown at 110, and a next BCH transport block is shown at 112. The frame periods are also shown, for example a periodicity of 40 ms for four radio frames, although the scope of the claimed subject matter is not limited in this respect. A Master Information Block (MIB) includes the information about downlink cell bandwidth, physical hybrid-ARQ indicator channel (PHICH) configuration, and System Frame Number (SFN). In particular, one MIB contains 14 information bits and 10 spare bits, which is appended by 16 bit cyclic redundancy check (CRC). The Tail Biting Convolutional Code (TBCC) is applied to the CRC-attached information bits and then rate-matching with the encoded bits is performed, which produces 1920 encoded bits and 1728 encoded bits for normal and extended cyclic prefix (CP), respectively.

Subsequently, a cell-specific scrambling code is applied on top of encoded bits to randomize the inter-cell interference. The cell-specific scrambling code is re-initialized at every 40 ms and thus can provide the function to distinguish 2-bit Least Significant Bit (LSB) of system frame number (SFN), which is the 10 milliseconds (ms), comprising one radio frame, boundary detection among 40 ms, comprising four radio frames, via the different phases of cell-specific scrambling sequences.

The PBCH is transmitted within the first four orthogonal frequency-division multiplexing (OFDM) symbols of the second slot of subframe zero (0) and only over the 72 center subcarriers excluding resource elements reserved for cell-specific reference signals (CRS) for four antenna ports. Thus, in the case of frequency division duplex (FDD), the PBCH follows immediately after the Primary Synchronization Signal (PSS) and Secondary Synchronization Signal (SSS) in subframe 0. Transmit antenna diversity may be also employed at the evolved NodeB (eNB) to further enhance coverage, depending on the capability of the eNB. More specifically, eNBs with two or four transmit antenna ports transmit the PBCH using a Space-Frequency Block Code (SFBC). The transmission mode of the PBCH as well as the number of PBCH antenna ports is blindly detected at the user equipment (UE) and is also encoded in the CRC of the MIB by scrambling the CRC bits depending on the number of PBCH antenna ports at the eNB.

The xMIB consists of a limited number of the most frequently transmitted parameters essential for initial access to the cell. Similar to a Long Term Evolution (LTE) specification of 3GPP, the xMIB may also carry the information regarding the system bandwidth. This field can be $X_0$ bits, which depends on the number of system bandwidth to be defined in a Fifth Generation (5G) standard. Alternatively, the system bandwidth can be UE-specifically configured as part of the radio resource control (RRC) connection setup, reconfiguration, or reestablishment. In this case, $X_0=0$. For a 5G system, PHICH may not be used or may be replaced by the xPDCCH. This indicates that PHICH configuration in the existing LTE specification optionally may not be used in the xMIB.

Similar to current LTE systems, xMIB content may also include the information about the SFN. The exact number of bits for SFN depends on the periodicity and number of scrambling phases for xPBCH transmission. If a single xPBCH block is transmitted during xPBCH periodicity, the number of bits for SFN in xMIB can be $X_1$ bits, for example $X_1=10$ as defined in an LTE specification. In another example, if xPBCH transmission periodicity is 80 ms and eight xPBCH blocks are transmitted during an 80 ms interval, the number of the bits for SFN in xMIB can be $X_1-\log 2(8)=(X_1-3)$ bits.

Furthermore, the xMIB may contain the configuration information for other physical channels. In one example, a 5G physical downlink control channel (xPDCCH) configuration for common search space may be included in the xMIB. After successfully decoding the xPBCH, UE can obtain the information for xPDCCH configuration and subsequently attempts to decode the system information block (xSIB).

Based on the analysis above, Table 1 summarizes the potential xMIB content for a xPBCH design. Note that certain number of spare bits may be reserved for further release.

TABLE 1 xMIB content for xPBCH design

| Parameters | Number of bits |
| --- | --- |
| Downlink system bandwidth | $X_0$ |
| SFN information | $X_1$ or less |
| Configuration for other physical channels | $X_2$ |

FIG. 1B illustrates example operations to generate the xPBCH in accordance with one or more embodiments. In one example, at block 114 CRC may be appended after the xMIB. In one embodiment, the existing 16-bit CRC in an LTE specification may be reused. Furthermore, the same operation on a CRC mask with a codeword corresponding to the number of transmit antenna ports may be employed for a xPBCH design as discussed herein. In another embodiment, to further reduce the false alarm rate due to multiple hypotheses tests with transmit (Tx) beamed xPBCH transmissions, the CRC size may be increased to 24-bits. In one example, the CRC with 24 bits as defined in an LTE specification may be reused wherein the parity bits are generated by one of the following cyclic generator polynomials:

$$g_{CRC24A}(D)=[D24+D23+D18+D17+D14+D11+D10+D7+D6+D5+D4+D3+D+1] \text{ and;}$$

$$g_{CRC24B}(D)=[D24+D23+D6+D5+D+1] \text{ for a CRC length } L=24$$

In yet another embodiment, the CRC mask with the codeword corresponding to the number of transmit antenna ports is not employed for xPBCH transmission. Such an arrangement would reduce the number of blind detection attempts and consequently UE power consumption.

Furthermore, to minimize the implementation cost, the existing tail-biting convolution coding (TBCC) scheme can be reused at block 116. After the channel coding, rate matching is performed at block 118 to fill out the available resource elements (REs) for xPBCH transmission. Depending on the number of scrambling phases, one or a plurality of subframes can be allocated for the transmission of xPBCH within one xPBCH periodicity. Furthermore, one xPBCH transmission block may occupy N OFDM symbols of M physical resource block (PRB) pairs. For example, M=6 and N=4 as defined in a current LTE specification.

After the channel coding and rate-matching, scrambling is performed at block 120 in order to randomize the interference and potentially to identify the SFN boundaries within an xPBCH transmission time interval. In particular, similar scrambling procedure as in an existing LTE specification may be applied. In one embodiment, the scrambling sequence may be initialized with the physical cell identifier (ID), for example $c_{mix}=N_{ID}^{cell}$. In a further embodiment, in the case of "single frequency network" type of operation wherein multiple eNBs transmit the xPBCH simultaneously on the same time and frequency resource, the scrambling sequence may be initialized with a predefined value or a cluster/sub-cluster ID. In other words, the scrambling seed is common among multiple eNBs when transmitting the xPBCH. In another embodiment, as interference randomization is not needed in the above case, one alternative is not to employ scrambling for xPBCH transmission time interval (TTI) indication, but to mask CRC with a codeword representing y-bit LSB of SFN, for example y=2. It may be beneficial in terms of processing complexity to check CRC four times instead of performing TBCC decoding four times. The number of antenna ports can be blindly detected from code-division multiplexing (CDM) based demodulation reference signals (DM-RS). Subsequently, quadrature phase shift keying (QPSK) can be used for the modulation at block 122. Antenna mapping and demultiplexing then may be performed.

Figure 2:
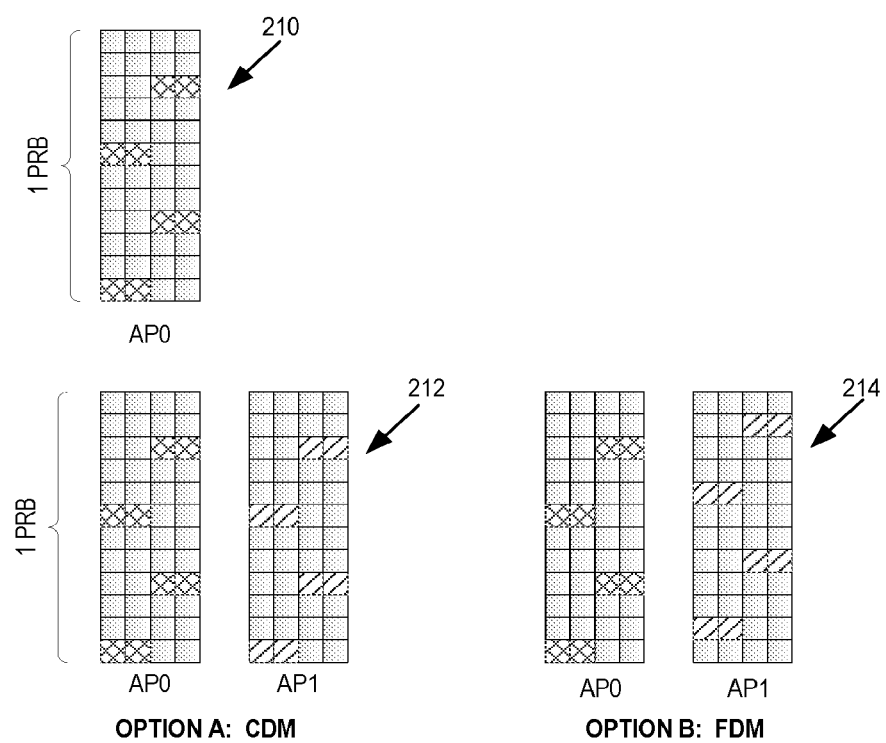
FIG. 2 are diagrams of example demodulation reference symbol (DM-RS) patterns in accordance with one or more embodiments.

Referring now to FIG. 2, diagrams of example demodulation reference symbol (DM-RS) patterns in accordance with one or more embodiments will be discussed. For lean system design, a cell specific reference symbol may not be present in order to reduce the overhead. Based on this concept, a Demodulation Reference Symbol (DM-RS) based transmission scheme may be applied for the transmission of xPBCH. In particular, the same beamforming weight may be applied for both DM-RS and data symbols allocated for the xPBCH. Depending on the number of antenna ports (AP) used for xPBCH transmission, single layer transmission or transmit (Tx) diversity may be employed.

FIG. 2 illustrates example of DM-RS patterns for xPBCH transmission with one access point (AP) for example 210 and two APs for example 212 and example 214, respectively. Note that the same DM-RS pattern may be applied on all the M PRBs. In the example shown in FIG. 2, four OFDM symbols may be assumed for the transmission of one xPBCH block wherein N=4. Note that other DM-RS patterns and the DM-RS patterns for four or more APs easily may be extended from the examples as shown in FIG. 2. In the case where two APs are used for xPBCH transmission, the DM-RS pattern for AP0 and AP1 may be separated in either code-division multiplexing (CDM) as shown in example 212 (Option A) or frequency-division multiplexing (FDM) as shown in example 214 (Option B). In one particular embodiment, for a CDM based DM-RS pattern as shown in example 212, orthogonal cover code (OCC) applied on the DM-RS for two APs may be [1 1] and [1 −1], respectively.

Figure 3:
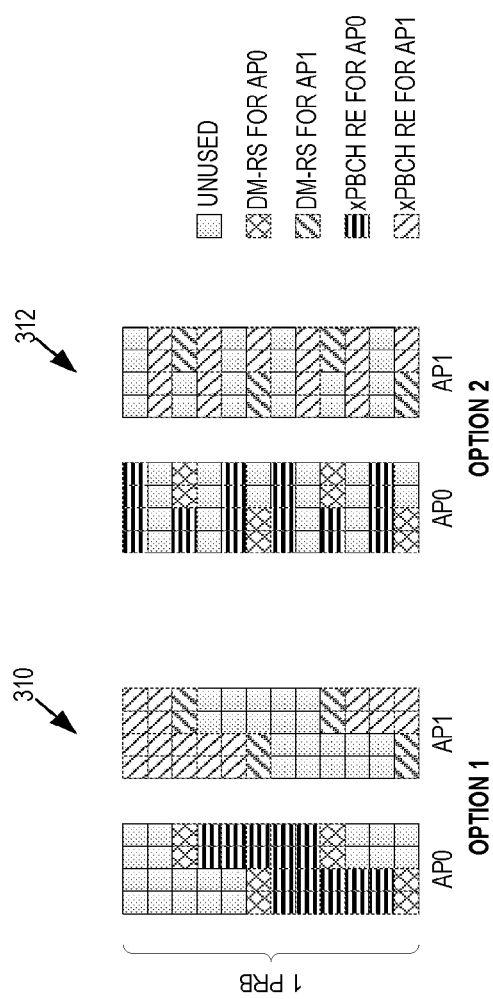
FIG. 3 is a diagram of xPBCH resource mapping for transmit (Tx) diversity with two access points in accordance with one or more embodiments.

Referring now to FIG. 3, a diagram of xPBCH resource mapping for transmit (Tx) diversity with two access points (APs) in accordance with one or more embodiments will be discussed. In the case of two APs, transmit (Tx) diversity may be employed to increase the link level performance. Depending on the DM-RS pattern, the resource mapping for the transmission of xPBCH may be different. FIG. 3 illustrates one example of xPBCH resource mapping scheme for Tx diversity with two APs when a code-division multiplexing (CDM) based Demodulation Reference Symbol (DM-RS) pattern is employed. More specifically, a localized resource mapping scheme is shown in example 310 (Option 1) and a distributed resource mapping scheme is shown in example 312 (Option 2). Note that other resource mapping schemes for different DM-RS patterns and/or for different number of APs may be extended straightforwardly from the examples shown in FIG. 3. Furthermore, similar to an existing LTE specification, the user equipment (UE) may blindly detect the number of APs for the transmission of the xPBCH. As mentioned above, the number of APs may be indicated via the CRC mask. Note that the time resource, for example symbol, slot, subframe or frame index, and frequency resource, for example subcarrier and PRB index, for the transmission of xPBCH may be predefined to facilitate the UE to quickly obtain the information for initial access. Several options may be considered for the time and/or frequency resource allocation for the xPBCH transmission as discussed, below.

In one embodiment, the xPBCH may be transmitted in the same subframe as xPSS/xSSS. In one example, the xPBCH and the xPSS/xSSS occupy the minimum system bandwidth to allow the UE to access the network with low complexity. In another example, in the case when the minimum system bandwidth is relatively large, multiple sub-bands may be allocated for the transmission of the xPSS/xSSS and/or the xPBCH. In this case, the xPSS/xSSS may be transmitted in the central sub-band while the xPBCH may be transmitted adjacent to the central sub-band. Alternatively, the xPBCH may be transmitted on different symbols from xPSS/xSSS, but with the same frequency location, for example in the central sub-band or multiple sub-bands. Note that compared to an existing LTE specification, the xPSS/xSSS also may serve the purpose of beam acquisition for mid-band and high band.

In another embodiment, a fixed subframe gap between the transmission of the xPBCH and the xPSS/xSSS may be specified. In one example, the xPBCH may be transmitted in the subframe next to the xPSS/xSSS transmission. This scheme may be appropriate for mid-band and high band when transmit (Tx) beamforming or repetition is applied for the transmission of the xPSS and the xSSS. In this case, the xPSS/xSSS and the xPBCH may span one or more subframes. In another example, the xPBCH may be transmitted before the xPSS/xSSS. Alternatively, the xPSS/xSSS may be transmitted between multiple xPBCH blocks.

Figure 4:
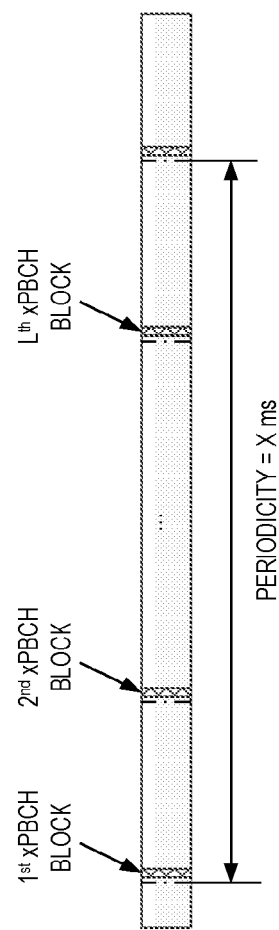
FIG. 4 is a diagram of xPBCH transmission time for low band in accordance with one or more embodiments.

Referring now to FIG. 4, a diagram of xPBCH transmission time for low band in accordance with one or more embodiments will be discussed. In the low band, the carrier frequency below 6 GHz, several options may be considered for the xPBCH transmission scheme. In one embodiment, a single xPBCH block, wherein L=1, may be transmitted during an X ms interval. Such an arrangement may help to reduce the number of blind decoding attempts, and consequently power consumption. In one example, X=40 ms as defined in an LTE specification.

In another embodiment, multiple xPBCH blocks, wherein L>1, may be transmitted during an X ms interval. FIG. 4 illustrates the xPBCH transmission time for low band. As shown in FIG. 4, the xPBCH can be transmitted with periodicity of X ms, and L xPBCH blocks may be transmitted within this X ms period. In other words, the scrambling code may be reinitialized at every X ms, and L different scrambling phases may be generated within X ms. In this case, the UE may perform multiple blind decoding attempts to obtain the xMIB information. If each block is self-decodable, however, cell attachment latency may be reduced from X to X/L ms.

Figure 5:
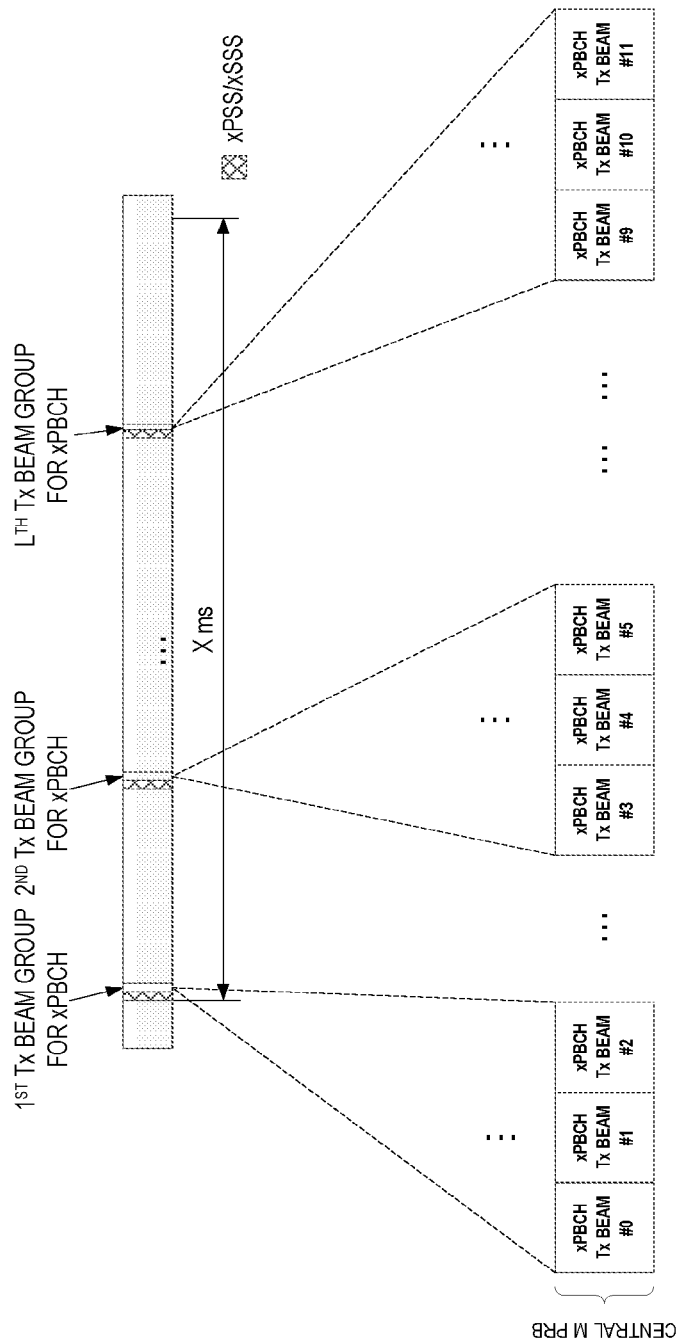
FIG. 5 is a diagram of an example of transmit (Tx) beamformed xPBCH transmission in accordance with one or more embodiments.
Figure 6:
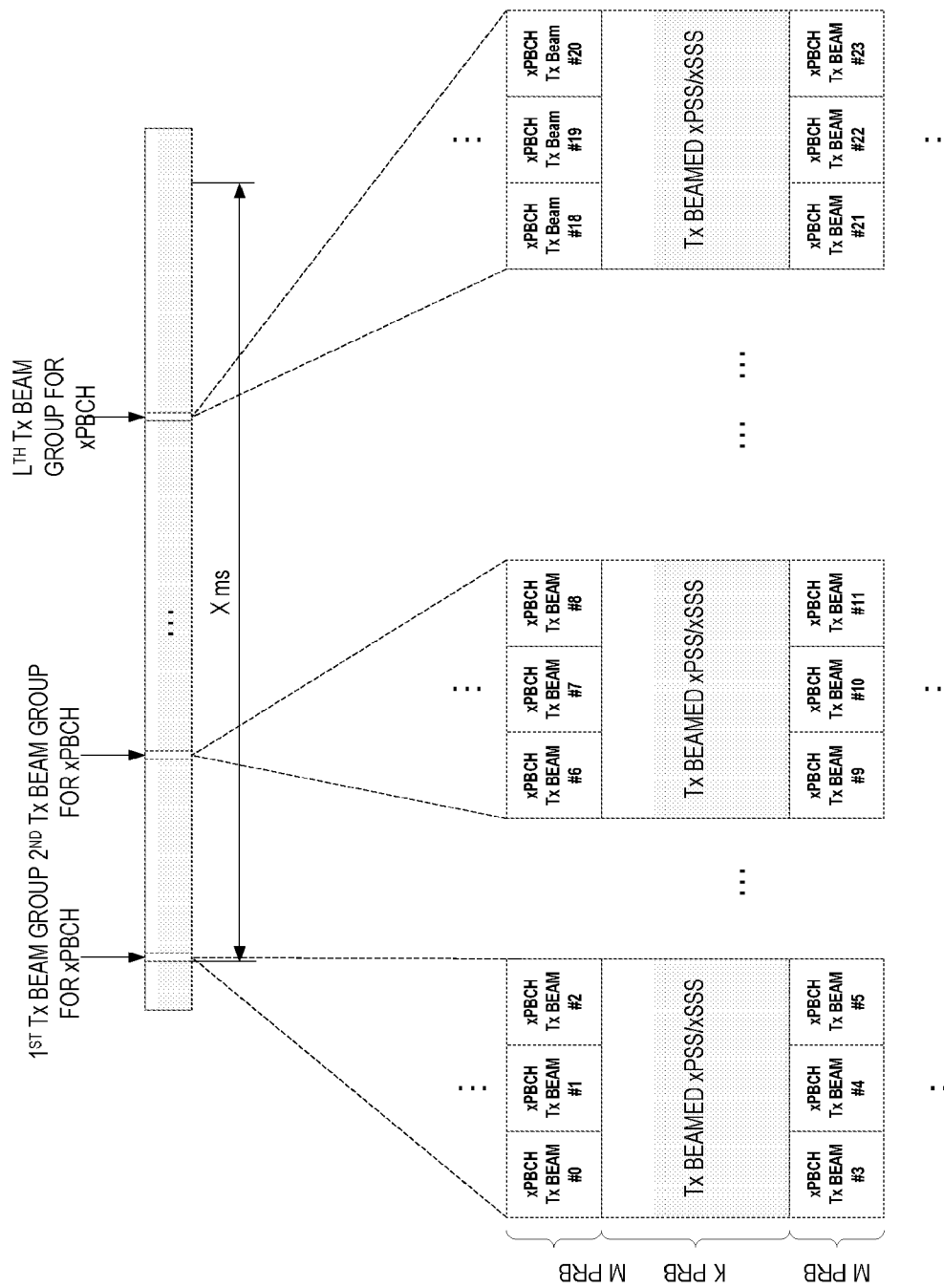
FIG. 6 is a diagram of another example of transmit (Tx) beamformed xPBCH transmission in accordance with one or more embodiments.

Referring now to FIG. 5 and FIG. 6, diagrams of example of transmit (Tx) beamformed xPBCH transmissions in accordance with one or more embodiments will be discussed. In the mid-band with a carrier frequency between 6 GHz and 30 GHz and high band with a carrier frequency beyond 30G Hz, beamforming may be utilized to ensure proper coverage. FIG. 5 and FIG. 6 illustrate examples of transmit (Tx) beamformed or repeated xPBCH transmission. Note that although as shown in FIG. 5 and FIG. 6, a transmit (Tx) beamformed xPBCH is considered, the same design principle may be applied for repeated xPBCH transmissions. Additionally, for the two examples shown in FIG. 5 and FIG. 6, a same scrambling phase may be applied to multiple xPBCH blocks within the xPBCH transmission periodicity, namely X ms as shown in FIG. 5 and FIG. 6. In this case, xPBCH blocks within a given transmit (Tx) beam group carry the same SFN information, and the SFN bits vary over each Tx beam group. For cooperative xPBCH transmission, different eNBs may transmit the xPBCH block in different time and/or frequency resources. For example, in FIG. 5, xPBCH block #0 may be transmitted by eNB #0 while xPBCH block #1 may be transmitted by eNB #1.

In FIG. 5, the xPBCH blocks are transmitted one subframe after the xPSS/xSSS transmission and occupy the central M PRBs. Within an X ms xPBCH transmission periodicity, L Tx beam groups may be used for the xPBCH transmission. In this example, L=4 and the total number of Tx beams or repeated xPBCH blocks within the X ms period is 12. In FIG. 6, xPBCH blocks are transmitted in the same subframe for the xPSS/xSSS transmission and occupy M PRBs which are adjacent to the xPSS/xSSS. In this example, totally 24 Tx beams or repeated block are used for the transmission of xPBCH within the X ms period.

Figure 7:
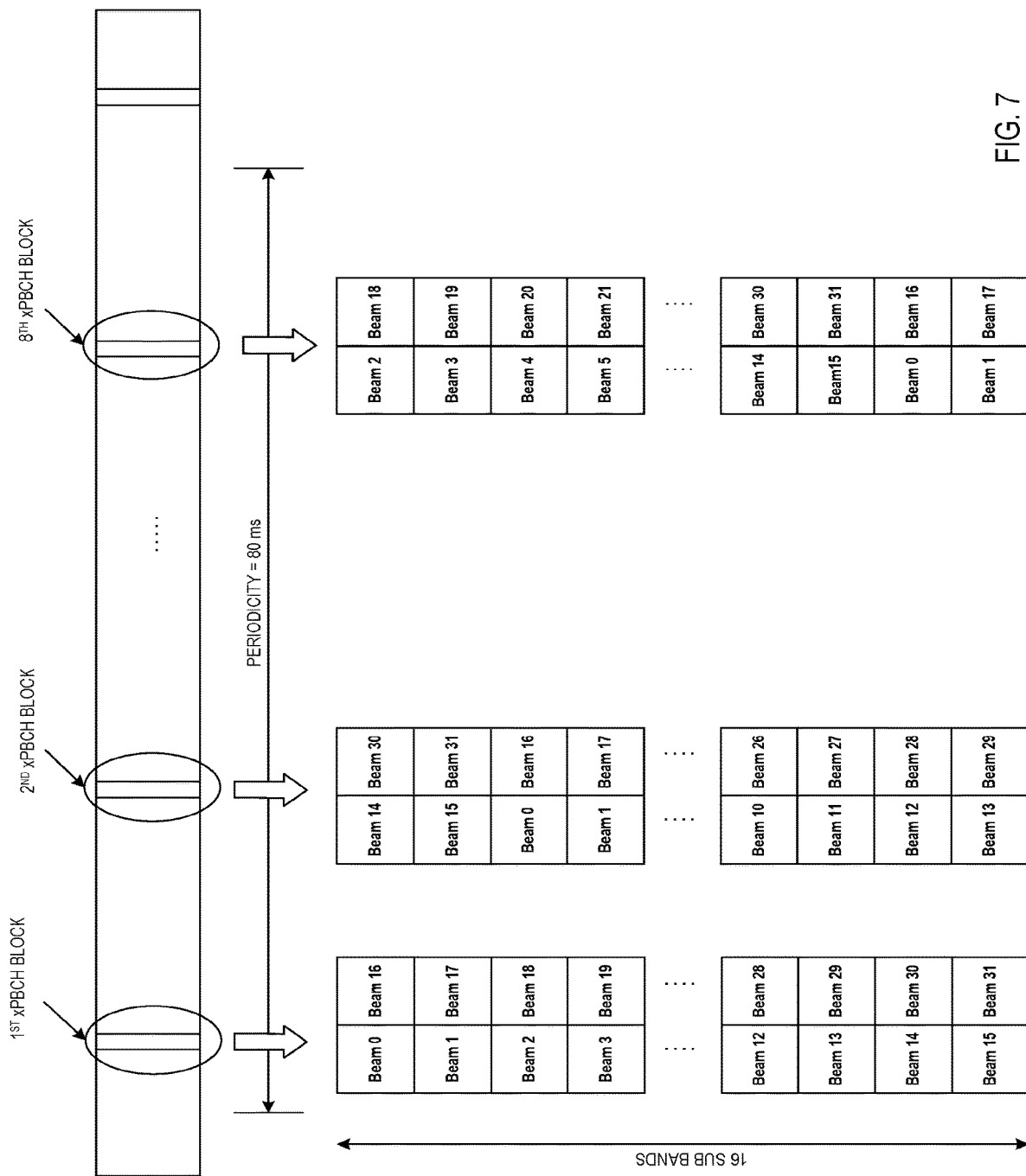
FIG. 7 is a diagram of yet another example of transmit (Tx) beamformed xPBCH transmission in accordance with one or more embodiments.

Referring now to FIG. 7, a diagram of yet another example of transmit (Tx) beamformed xPBCH transmission in accordance with one or more embodiments will be discussed. In FIG. 7, the channel coded and symbol modulated xPBCH is de-multiplexed into eight xPBCH blocks. A given self-decodable xPBCH block may be beamformed with 32 different transmit (Tx) beams, and resulting multiple beamformed blocks may be transmitted on different sub-bands of OFDM, or other block transmission waveform, symbols allocated for xPBCH transmission. In mid-to-high frequency bands, the minimum system bandwidth may be defined with a large number of resource blocks (RBs), for example 100 RBs with 75 kHz subcarrier spacing. As shown in FIG. 7, xPBCH Tx beam to sub-band mapping may be circularly shifted over different xPBCH blocks. Such an arrangement is capable of providing time and frequency diversity gains to coverage limited UEs which may perform soft bit combining of multiple xPBCH blocks for reliable decoding of the xPBCH.

It should be noted that different number of transmit (Tx) beams and resource allocation schemes, for example allocation of multiple sub-bands in the frequency domain, may be extended straightforwardly from the examples as shown in FIG. 5, FIG. 6, or FIG. 7. The xPBCH transmission resource size, for example the number of symbols and/or the number of PRBs or sub-bands, may be predetermined in a way that the predetermined resource size may accommodate the maximum number of beam sets within a cell or within a network. Each beam set may comprise one or more beams from different eNBs or different array antennas within the same eNB, and may be mapped to one unique time and/or frequency resource for xPBCH transmission. Beam diversity based xPBCH transmission may be beneficial to reduce the xPBCH overhead without losing the beam coverage.

Regarding the Tx beam patterns for the xPBCH transmission, several options can be considered as follows. In one embodiment, the transmit (Tx) beam pattern is up to implementation by the eNB. The UE may assume that different Tx beams are applied for different xPBCH blocks. In this case, the UE first measures the energy of the DM-RS on the corresponding resources. If the measured DM-RS energy is above a certain threshold, the UE then attempts to decode the xPBCH block.

In another embodiment, the transmit (Tx) beam index or the time and/or frequency resource for the xPBCH transmission may be defined as a function of the beam index used for the transmission of the xPSS and/or the xSSS and/or cell ID. After acquiring the Tx beam index from xPSS and/or the xSSS, the UE may derive the location of best Tx beam index for the xPBCH transmission. In this case, the UE does not have to measure the DM-RS for all the xPBCH blocks, thereby reducing the power consumption. For instance, in FIG. 5, a one-to-one mapping between the Tx beam index used for the xPSS and the xPBCH block may be defined. In this case, the UE only has to search a limited number of resources for xPBCH decoding.

As mentioned, above, in the case of "single frequency network" type of operation, multiple eNBs transmit the xPBCH block simultaneously on the same time and frequency resource, which may help to exploit the benefit of multi-site beam diversity. Furthermore, DM-RS and data symbols used for xPBCH transmission may use the same multiple beams from multiple eNBs to allow proper channel estimation.

Figure 8:
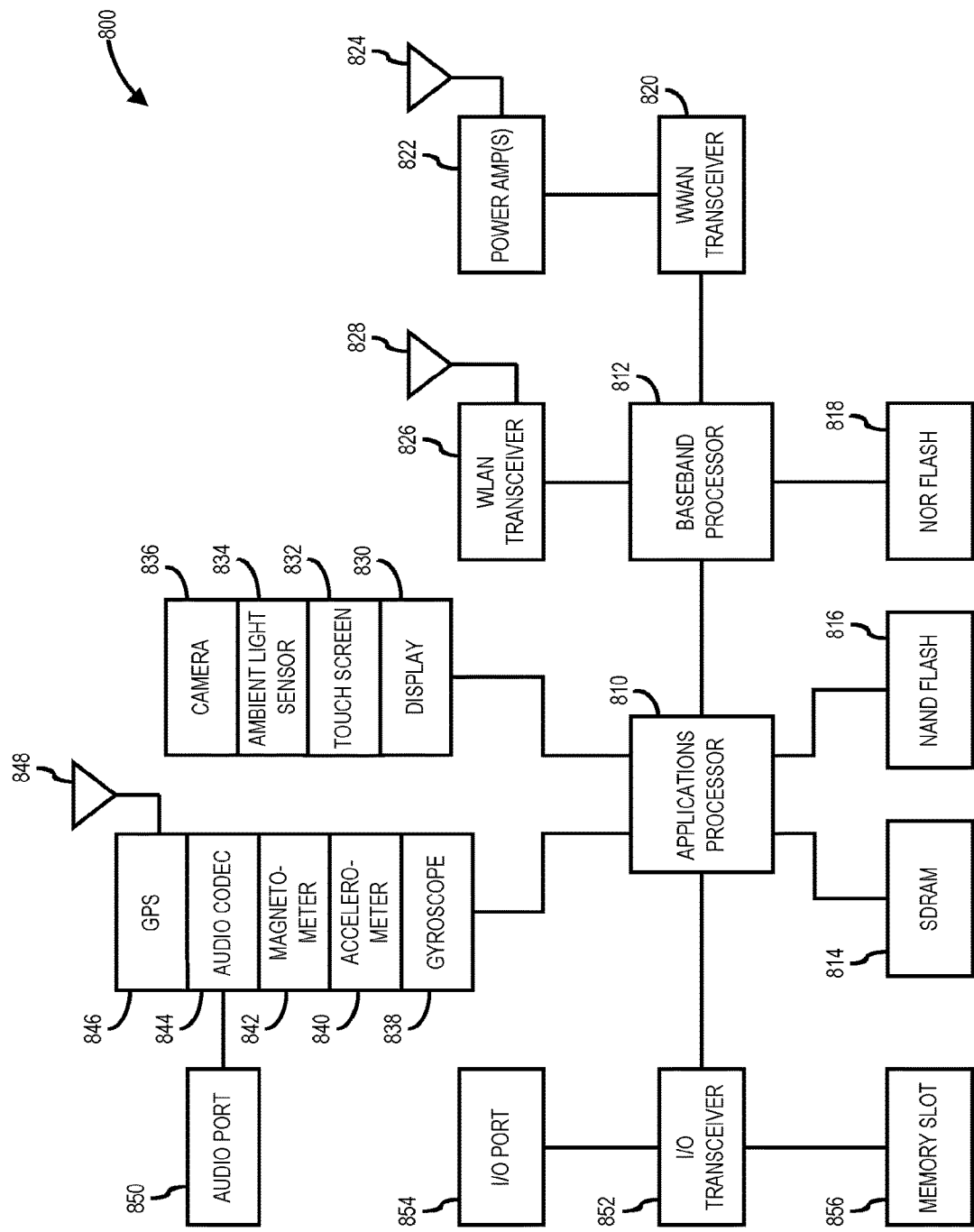
FIG. 8 is a block diagram of an information handling system capable of transmitting or receiving a physical broadcast channel in accordance with one or more embodiments.

Referring now to FIG. 8, a block diagram of an information handling system capable of transmitting or receiving a physical broadcast channel in accordance with one or more embodiments will be discussed. Information handling system 800 of FIG. 8 may tangibly embody any one or more of the network elements described herein with greater or fewer components depending on the hardware specifications of the particular device. In one embodiment, information handling system 800 may tangibly embody an apparatus of an evolved NodeB (eNB) comprising circuitry to configure, via baseband processing circuitry, one or more parameters for a Fifth Generation (5G) master information block (xMIB), wherein the xMIB contains at least one of the following parameters: downlink system bandwidth, system frame number (SFN), or configuration for other physical channels, or a combination thereof, and transmit, via radio-frequency processing circuitry, the xMIB via a 5G physical broadcast channel (xPBCH) on a predefined resource. In another embodiment, information handling system 800 may tangibly may embody one or more computer-readable media having instructions stored thereon that, if executed by an evolved NodeB (eNB), result in configuring one or more parameters for a Fifth Generation (5G) master information block (xMIB) for a 5G physical broadcast channel transmission (xPBCH), applying a Demodulation Reference Symbol (DM-RS) based transmission for the xPBCH transmission, wherein a same beamforming weight is applied for both DM-RS and for data symbols allocated for the xPBCH, and transmitting the xMIB via the xPBCH on a predefined resource. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an application processor 810 and a baseband processor 812. Application processor 810 may be utilized as a general-purpose processor to run applications and the various subsystems for information handling system 800. Application processor 810 may include a single core or alternatively may include multiple processing cores. One or more of the cores may comprise a digital signal processor or digital signal processing (DSP) core. Furthermore, application processor 810 may include a graphics processor or coprocessor disposed on the same chip, or alternatively a graphics processor coupled to application processor 810 may comprise a separate, discrete graphics chip. Application processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a 3GPP LTE or LTE-Advanced network or the like.

In general, WWAN transceiver 820 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, millimeter wave (mmWave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 820 couples to one or more power amps 842 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 810 and baseband processor 812, and the scope of the claimed subject matter is not limited in these respects. For example, any one or more of SDRAM 614, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, application processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by application processor 810 and/or at least temporarily stored in NAND flash 816. Furthermore, application processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, application processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects.

Figure 9:
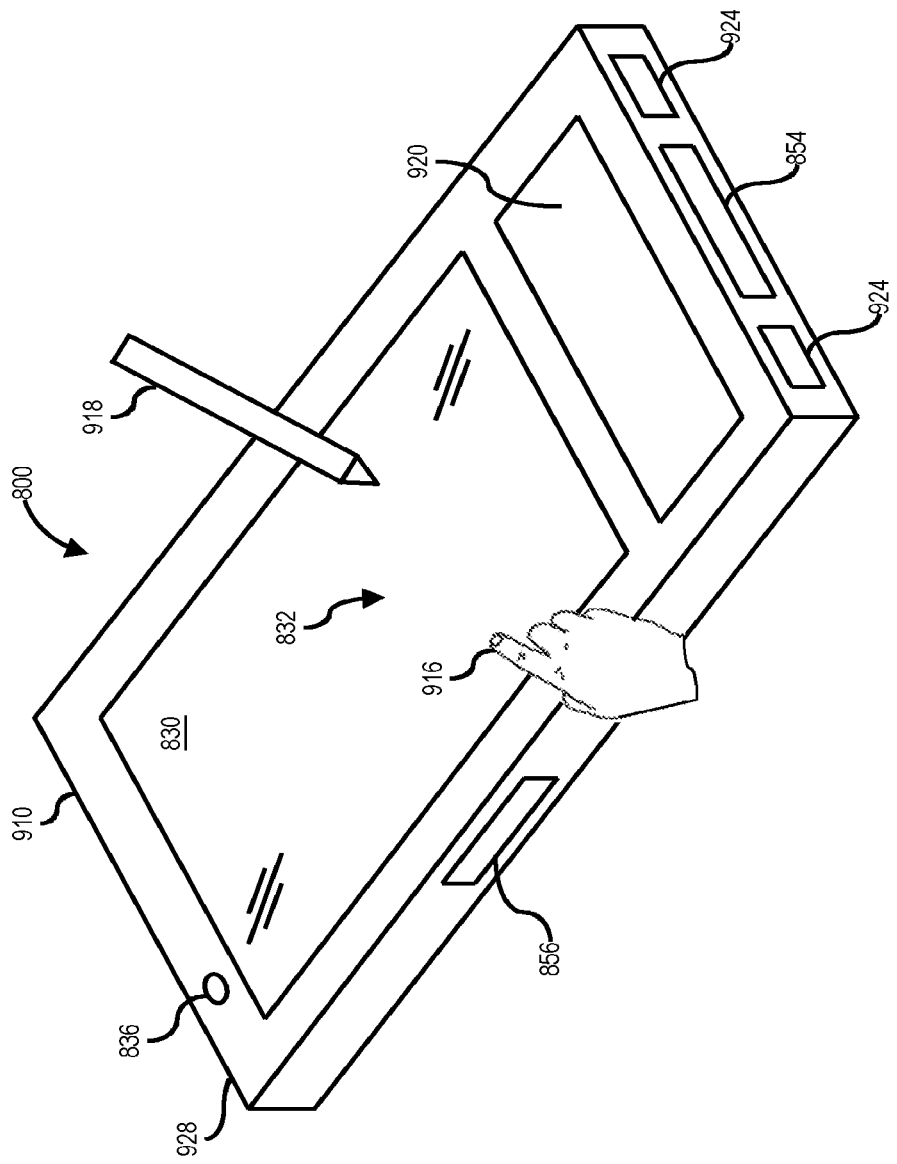
FIG. 9 is an isometric view of an information handling system of FIG. 6 that optionally may include a touch screen in accordance with one or more embodiments.

Referring now to FIG. 9, an isometric view of an information handling system of FIG. 8 that optionally may include a touch screen in accordance with one or more embodiments will be discussed. FIG. 9 shows an example implementation of information handling system 800 of FIG. 8 tangibly embodied as a cellular telephone, smartphone, or tablet type device or the like. The information handling system 800 may comprise a housing 910 having a display 830 which may include a touch screen 832 for receiving tactile input control and commands via a finger 916 of a user and/or a via stylus 918 to control one or more application processors 810. The housing 910 may house one or more components of information handling system 800, for example one or more application processors 810, one or more of SDRAM 814, NAND flash 816, NOR flash 818, baseband processor 812, and/or WWAN transceiver 820. The information handling system 800 further may optionally include a physical actuator area 920 which may comprise a keyboard or buttons for controlling information handling system via one or more buttons or switches. The information handling system 800 may also include a memory port or slot 856 for receiving non-volatile memory such as flash memory, for example in the form of a secure digital (SD) card or a subscriber identity module (SIM) card. Optionally, the information handling system 800 may further include one or more speakers and/or microphones 924 and a connection port 854 for connecting the information handling system 800 to another electronic device, dock, display, battery charger, and so on. In addition, information handling system 800 may include a headphone or speaker jack 928 and one or more cameras 836 on one or more sides of the housing 910. It should be noted that the information handling system 800 of FIG. 9 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 10:
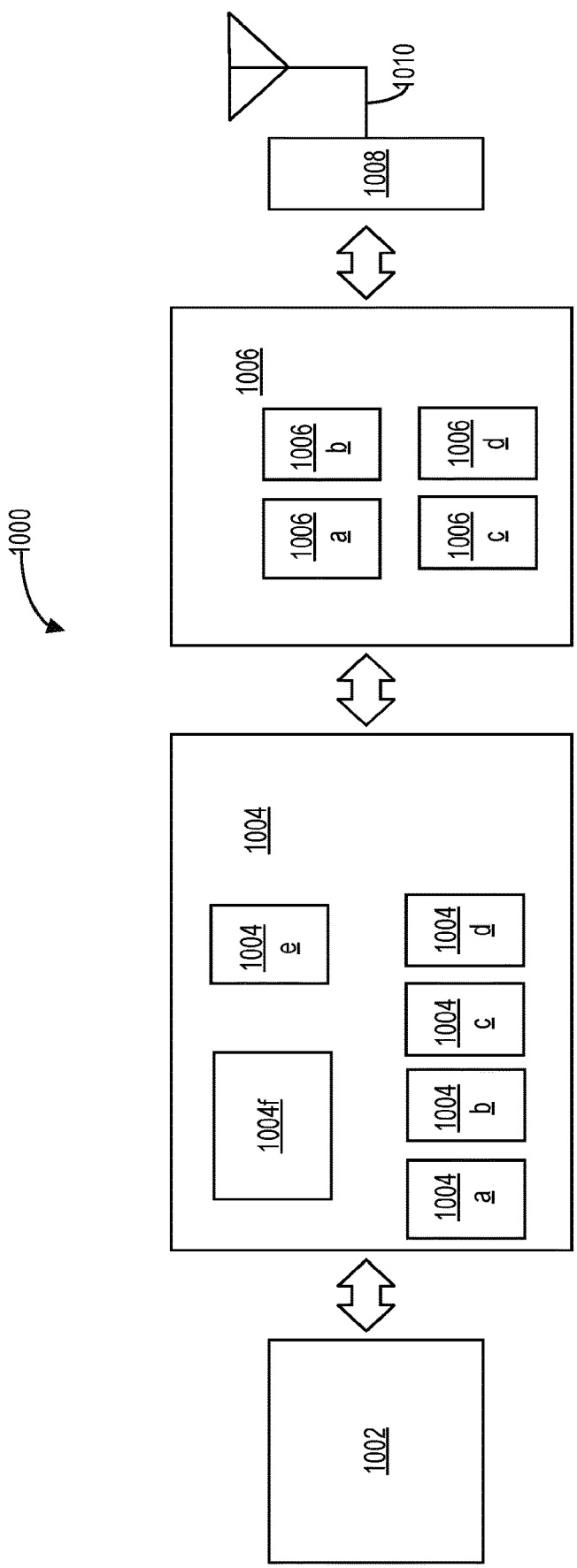
FIG. 10 is a diagram of example components of a wireless device in accordance with one or more embodiments.

Referring now to FIG. 10, example components of a wireless device such as an evolved NodeB (eNB) device or a User Equipment (UE) device in accordance with one or more embodiments will be discussed. For purposes of discussion, the wireless device of FIG. 10 will be referred to as an eNB device, although the scope of the claimed subject matter is not limited in this respect. In some embodiments, eNB device 1000 may include application circuitry 1002, baseband circuitry 1004, Radio Frequency (RF) circuitry 1006, front-end module (FEM) circuitry 1008 and one or more antennas 1010, coupled together at least as shown.

Application circuitry 1002 may include one or more application processors. For example, application circuitry 1002 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 1004 may include circuitry such as, but not limited to, one or more single-core or multi-core processors. Baseband circuitry 1004 may include one or more baseband processors and/or control logic to process baseband signals received from a receive signal path of RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 804 may include a second generation (2G) baseband processor 1004*a*, third generation (3G) baseband processor 1004*b*, fourth generation (4G) baseband processor 1004*c*, and/or one or more other baseband processors 1004*d* for other existing generations, generations in development or to be developed in the future, for example fifth generation (5G), sixth generation (6G), and so on. Baseband circuitry 1004, for example one or more of baseband processors 1004*a* through 1004*d*, may handle various radio control functions that enable communication with one or more radio networks via RF circuitry 1006. The radio control functions may include, but are not limited to, signal modulation and/or demodulation, encoding and/or decoding, radio frequency shifting, and so on. In some embodiments, modulation and/or demodulation circuitry of baseband circuitry 1004 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processors (DSP) 1004f. The one or more audio DSPs 1004f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 1004 and application circuitry 1002 may be implemented together such as, for example, on a system on a chip (SOC).

In some embodiments, baseband circuitry 1004 may provide for communication compatible with one or more radio technologies. For example, in some embodiments, baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, RF circuitry 1006 may include switches, filters, amplifiers, and so on, to facilitate the communication with the wireless network. RF circuitry 1006 may include a receive signal path which may include circuitry to down-convert RF signals received from FEM circuitry 1008 and provide baseband signals to baseband circuitry 1004. RF circuitry 1006 may also include a transmit signal path which may include circuitry to up-convert baseband signals provided by the baseband circuitry 1004 and provide RF output signals to FEM circuitry 1008 for transmission.

In some embodiments, RF circuitry 1006 may include a receive signal path and a transmit signal path. The receive signal path of RF circuitry 1006 may include mixer circuitry 1006a, amplifier circuitry 1006b and filter circuitry 1006c. The transmit signal path of RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from FEM circuitry 1008 based on the synthesized frequency provided by synthesizer circuitry 1006d. Amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to baseband circuitry 1004 for further processing. In some embodiments, the output baseband signals may be zero-frequency baseband signals, although this may be optional. In some embodiments, mixer circuitry 1006a of the receive signal path may comprise passive mixers, although the scope of the embodiments is not limited in this respect.

In some embodiments, mixer circuitry 1006a of the transmit signal path may be configured to up-convert input baseband signals based on the synthesized frequency provided by synthesizer circuitry 1006d to generate RF output signals for FEM circuitry 1008. The baseband signals may be provided by the baseband circuitry 1004 and may be filtered by filter circuitry 1006c. Filter circuitry 1006c may include a low-pass filter (LPF), although the scope of the embodiments is not limited in this respect.

In some embodiments, mixer circuitry 1006a of the receive signal path and the mixer circuitry 1006a of the transmit signal path may include two or more mixers and may be arranged for quadrature down conversion and/or up conversion respectively. In some embodiments, mixer circuitry 1006a of the receive signal path and the mixer circuitry 1006a of the transmit signal path may include two or more mixers and may be arranged for image rejection, for example Hartley image rejection. In some embodiments, mixer circuitry 1006a of the receive signal path and the mixer circuitry 1006a may be arranged for direct down conversion and/or direct up conversion, respectively. In some embodiments, mixer circuitry 1006a of the receive signal path and mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 1006 may include analog-to-digital converter (ADC) and digital-to-analog converter (DAC) circuitry, and baseband circuitry 1004 may include a digital baseband interface to communicate with RF circuitry 1006. In some dual-mode embodiments, separate radio integrated circuit (IC) circuitry may be provided for processing signals for one or more spectra, although the scope of the embodiments is not limited in this respect.

In some embodiments, synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

Synthesizer circuitry 1006d may be configured to synthesize an output frequency for use by mixer circuitry 1006a of RF circuitry 1006 based on a frequency input and a divider control input. In some embodiments, synthesizer circuitry 1006d may be a fractional N/N+1 synthesizer.

In some embodiments, frequency input may be provided by a voltage controlled oscillator (VCO), although this may be optional. Divider control input may be provided by either baseband circuitry 1004 or applications processor 1002 depending on the desired output frequency. In some embodiments, a divider control input (e.g., N) may be determined from a look-up table based on a channel indicated by applications processor 1002.

Synthesizer circuitry 1006*d* of RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by RF circuitry 1006 for transmission by one or more of the one or more antennas 1010.

In some embodiments, FEM circuitry 1008 may include a transmit/receive (TX/RX) switch to switch between transmit mode and receive mode operation. FEM circuitry 1008 may include a receive signal path and a transmit signal path. The receive signal path of FEM circuitry 1008 may include a low-noise amplifier (LNA) to amplify received RF signals and to provide the amplified received RF signals as an output, for example to RF circuitry 1006. The transmit signal path of FEM circuitry 1008 may include a power amplifier (PA) to amplify input RF signals, for example provided by RF circuitry 1006, and one or more filters to generate RF signals for subsequent transmission, for example by one or more of antennas 1010. In some embodiments, eNB device 1000 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of an evolved NodeB (eNB) comprising circuitry to configure, via baseband processing circuitry, one or more parameters for a Fifth Generation (5G) master information block (xMIB), wherein the xMIB contains at least one of the following parameters: downlink system bandwidth, system frame number (SFN), or configuration for other physical channels, or a combination thereof, and transmit, via radio-frequency processing circuitry, the xMIB via a 5G physical broadcast channel (xPBCH) on a predefined resource. In example two, the apparatus may include the subject matter of example one or any of the examples described herein, wherein the configuration of other physical channels comprises a 5G physical downlink control channel (xPDCCH) configuration for a common search space. In example three, the apparatus may include the subject matter of example one or any of the examples described herein, and further may comprise circuitry to apply a cyclic redundancy check (CRC) is attached to the xMIB. In example four, the apparatus may include the subject matter of example one or any of the examples described herein, wherein the CRC comprises 16-bits or 24-bits, and wherein the CRC is masked with a codeword corresponding to a number of transmit antenna ports. In example five, the apparatus may include the subject matter of example one or any of the examples described herein, wherein a CRC mask with a codeword corresponding to the number of transmit antenna ports is not utilized for the xPBCH transmission. In example six, the apparatus may include the subject matter of example one or any of the examples described herein, wherein the CRC is masked with a least significant bit (LSB) of a system frame number (SFN). In example seven, the apparatus may include the subject matter of example one or any of the examples described herein, and further may comprise circuitry to apply a Tail Biting Convolutional Code (TBCC) to the CRC-attached xMIB. In example eight, the apparatus may include the subject matter of example one or any of the examples described herein, and further may comprise baseband processing circuitry to perform rate matching to fill out available resource elements (REs) for xPBCH transmission. In example nine, the apparatus may include the subject matter of example one or any of the examples described herein, and further may comprise baseband processing circuitry to perform scrambling on the encoded bits. In example ten, the apparatus may include the subject matter of example one or any of the examples described herein, wherein a scrambling sequence is initialized with a physical cell identifier (ID). In example eleven, the apparatus may include the subject matter of example one or any of the examples described herein, and further may comprise baseband processing circuitry to initialize a sequence is initialized with a predefined value, or a cluster or a sub-cluster identifier (ID), wherein multiple eNBs transmit the xPBCH simultaneously on a same time resource and a same frequency resource. In example twelve, the apparatus may include the subject matter of example one or any of the examples described herein, and further may comprise baseband processing circuitry to modulate the xPBCH transmission with quadrature phase shift keying (QPSK).

In example thirteen, one or more computer-readable media may have instructions stored thereon that, if executed by an evolved NodeB (eNB), result in configuring one or more parameters for a Fifth Generation (5G) master information block (xMIB) for a 5G physical broadcast channel transmission (xPBCH), applying a Demodulation Reference Symbol (DM-RS) based transmission for the xPBCH transmission, wherein a same beamforming weight is applied for both DM-RS and for data symbols allocated for the xPBCH, and transmitting the xMIB via the xPBCH on a predefined resource. In example fourteen, the one or more computer-readable media may include the subject matter of example thirteen or any of the examples described herein, wherein single layer transmission is applied for the xPBCH transmission. In example fifteen, the one or more computer-readable media may include the subject matter of example thirteen or any of the examples described herein, wherein the instructions, if executed by the eNB, further result in applying transmit diversity for the xPBCH transmission for two or more antenna ports. In example sixteen, the one or more computer-readable media may include the subject matter of example thirteen or any of the examples described herein, wherein a time resource in term of symbol, slot, subframe or frame index and frequency resource in term of subcarrier and physical resource block (PRB) index for the xPBCH transmission is predefined, wherein the xPBCH is transmitted in a same subframe as a 5G primary synchronization signal (xPSS) or a 5G secondary synchronization signal (xSSS), or wherein the xPBCH is transmitted within a same sub-band as the xPSS or the xSSS, or a the sub-band adjacent to the xPSS or the xSSS. In example seventeen, the one or more computer-readable media may include the subject matter of example thirteen or any of the examples described herein, wherein a fixed subframe gap between the transmission of the xPBCH and the xPSS or the xSSS is specified. In example eighteen, the one or more computer-readable media may include the subject matter of example thirteen or any of the examples described herein, wherein a single xPBCH block is transmitted within a xPBCH transmission period, or wherein multiple xPBCH blocks are transmitted within a xPBCH transmission period. In example nineteen, the one or more computer-readable media may include the subject matter of example thirteen or any of the examples described herein, wherein the instructions, if executed by the eNB, further result in using a transmit beamformed xPBCH or a repeated xPBCH for a mid-band or a high-band carrier frequency. In example twenty, the one or more computer-readable media may include the subject matter of example thirteen or any of the examples described herein, wherein a transmit beam pattern is up to implementation by the eNB, and wherein user equipment (UE) measures Demodulation Reference Symbol (DM-RS) energy on each xPBCH resource to decode the xPBCH. In example twenty-one, the one or more computer-readable media may include the subject matter of example thirteen or any of the examples described herein, wherein a transmit beam index or a time or frequency resource for the xPBCH transmission comprises a function of a transmit beam index of a 5G primary synchronization signal (xPSS), a 5G secondary synchronization signal (xSSS), or a cell identifier (ID), or a combination thereof. In example twenty-two, the one or more computer-readable media may include the subject matter of example thirteen or any of the examples described herein, wherein xPBCH transmit beam to sub-band mapping is circularly shifted over different xPBCH blocks. In example twenty-three, the one or more computer-readable media may include the subject matter of example thirteen or any of the examples described herein, wherein different eNBs transmit the xPBCH block in a different time resource, or a different frequency resource, or a combination thereof, for cooperative xPBCH transmission. In example twenty-four, the one or more computer-readable media may include the subject matter of example thirteen or any of the examples described herein, wherein a xPBCH resource size within one xPBCH transmission period accommodates a maximum number of beam sets within a cell or within a network, wherein each beam set comprises one or more beams from different eNBs or different array antennas within a same eNB, and wherein each beam set is mapped to a unique time resource, or a unique frequency resource, or a combination thereof, for xPBCH transmission.

Although the claimed subject matter has been described with a certain degree of particularity, it should be recognized that elements thereof may be altered by persons skilled in the art without departing from the spirit and/or scope of claimed subject matter. It is believed that the subject matter pertaining to physical broadcast channel design and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A base station, comprising:
    radio frequency (RF) circuitry configured to communicate with a user equipment (UE) in a fifth generation (5G) network; and
    a processor communicatively coupled to the RF circuitry and configured to perform operations, comprising:
        configuring one or more parameters for a 5G master information block (MIB), wherein the 5G MIB comprises a downlink system bandwidth, a 5G physical downlink control channel (PDCCH) configuration and a system frame number, SFN;
        generating a 5G physical broadcast channel (PBCH) from the 5G MIB, wherein a cyclic redundancy check (CRC) is attached to the 5G MIB;
        applying a Demodulation Reference Symbol (DM-RS) based transmission for the 5G PBCH, wherein a same beamforming weight is applied for the DM-RS and for data symbols allocated for the 5G PBCH; and
        transmitting the 5G MIB via the 5G PBCH on a predefined resource and a 5G frequency band over 6 giga hertz (GHz).

2. The base station of claim 1, wherein the predefined resource comprises a time resource in terms of symbol, slot, subframe or frame index or a frequency resource in terms of subcarrier and physical resource block (PRB) index for the 5G PBCH.

3. The base station of claim 1, wherein the 5G PBCH is transmitted in a same subframe as a primary synchronization signal (PSS) or a secondary synchronization signal (SSS).

4. The base station of claim 1, wherein the 5G PBCH is transmitted in a same sub-band as a primary synchronization signal (PSS) or a secondary synchronization signal (SSS) or a sub-band adjacent to the PSS or the SSS.

5. The base station of claim 1, wherein a fixed subframe gap between the transmission of the 5G PBCH and a primary synchronization signal (PSS) or a secondary synchronization signal (SSS) is specified.

6. The base station of claim 1, wherein the CRC comprises 16-bits or 24-bits.

7. The base station of claim 1, wherein the CRC is applied without a CRC mask with a codeword corresponding to a number of transmit antenna ports.

8. The base station of claim 1, wherein the operations further comprise:
    performing rate matching to fill out available resource elements for 5G PBCH transmission.

9. The base station of claim 1, wherein the operations further comprise:
   scrambling the encoded bits, wherein a scrambling sequence is initialized with a physical cell identifier.

10. The base station of claim 1, wherein the operations further comprise:
    modulating the PBCH transmission with quadrature phase shift keying.

11. The base station of claim 1, wherein the MIB further includes a configuration for a common search space.

12. A processor of a base station configured to perform operations, comprising:
    configuring one or more parameters for a fifth generation (5G) master information block (MIB), wherein the 5G MIB comprises a downlink system bandwidth, a 5G physical downlink control channel (PDCCH) configuration and a system frame number, SFN;
    generating a 5G physical broadcast channel (PBCH) from the 5G MIB, wherein a cyclic redundancy check (CRC) is attached to the 5G MIB;
    applying a Demodulation Reference Symbol (DM-RS) based transmission for the 5G PBCH, wherein a same beamforming weight is applied for the DM-RS and for data symbols allocated for the 5G PBCH; and
    transmitting the 5G MIB via the 5G PBCH on a predefined resource and a 5G frequency band over 6 giga hertz (GHz).

13. The processor of claim 12, wherein the predefined resource comprises a time resource in terms of symbol, slot, subframe or frame index or a frequency resource in terms of subcarrier and physical resource block (PRB) index for the 5G PBCH.

14. The processor of claim 12, wherein the 5G PBCH is transmitted in a same subframe as a primary synchronization signal (PSS) or a secondary synchronization signal (SSS).

15. The processor of claim 12, wherein the 5G PBCH is transmitted in a same sub-band as a primary synchronization signal (PSS) or a secondary synchronization signal (SSS) or a sub-band adjacent to the PSS or the SSS.

16. The processor of claim 12, wherein a fixed subframe gap between the transmission of the 5G PBCH and a primary synchronization signal (PSS) or a secondary synchronization signal (SSS) is specified.

17. The processor of claim 12, wherein the CRC comprises 16-bits or 24-bits, wherein the CRC is applied without a CRC mask with a codeword corresponding to a number of transmit antenna ports.

18. A method, comprising:
    configuring one or more parameters for a 5G master information block (MIB), wherein the 5G MIB comprises a downlink system bandwidth, a 5G physical downlink control channel (PDCCH) configuration and a system frame number, SFN;
    generating a 5G physical broadcast channel (PBCH) from the 5G MIB, wherein a cyclic redundancy check (CRC) is attached to the 5G MIB;
    applying a Demodulation Reference Symbol (DM-RS) based transmission for the 5G PBCH, wherein a same beamforming weight is applied for the DM-RS and for data symbols allocated for the 5G PBCH; and
    transmitting the 5G MIB via the 5G PBCH on a predefined resource and a 5G frequency band over 6 giga hertz (GHz).

19. The method of claim 18, wherein the predefined resource comprises a time resource in terms of symbol, slot, subframe or frame index or a frequency resource in terms of subcarrier and physical resource block (PRB) index for the 5G PBCH.

20. The method of claim 18, wherein the CRC comprises 16-bits or 24-bits, wherein the CRC is applied without a CRC mask with a codeword corresponding to a number of transmit antenna ports.

\* \* \* \* \*